/ 455/608

United States Patent [19]
Beasley et al.

[11] 4,307,468
[45] Dec. 22, 1981

[54] DATA TRANSMISSION SYSTEMS

[75] Inventors: Robin D. Beasley, Chatham; Robert James, Rainham, both of England

[73] Assignee: Elliott Brothers (London) Limited, Chelmsford, England

[21] Appl. No.: 138,851

[22] Filed: Apr. 8, 1980

[30] Foreign Application Priority Data

Apr. 17, 1979 [GB] United Kingdom ............... 13270/79

[51] Int. Cl.³ .............................................. H04B 9/00
[52] U.S. Cl. .................................... 455/608; 358/262; 375/38
[58] Field of Search ............................ 375/17, 21, 38; 358/262; 455/608, 612, 617

[56] References Cited

U.S. PATENT DOCUMENTS

| 2,252,293 | 8/1941  | Ohl ........................ 375/21 |
| 3,461,390 | 8/1969  | Mack ...................... 375/17 |
| 4,027,152 | 5/1977  | Brown ..................... 455/608 |
| 4,056,828 | 11/1977 | Furuta ..................... 375/17 |
| 4,084,069 | 4/1978  | Looschen .................. 375/17 |
| 4,090,154 | 5/1978  | Hauchart ................... 375/17 |
| 4,201,909 | 5/1980  | Dogliotti .................. 455/608 |

Primary Examiner—Howard Britton
Attorney, Agent, or Firm—Kirschstein, Kirschstein, Ottinger & Cobrin

[57] ABSTRACT

A data transmission system including a transmitting station (13 to 15 and T) wherein three-state signals representing data are converted to two-state signals so that the data can be transmitted via a transmission line adapted to transmit only two-state signals such as a fibre optic transmission line.

5 Claims, 3 Drawing Figures

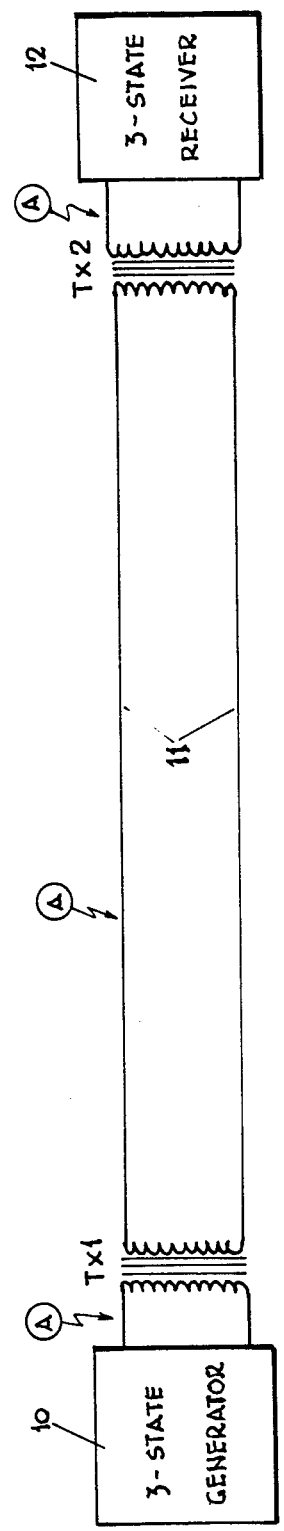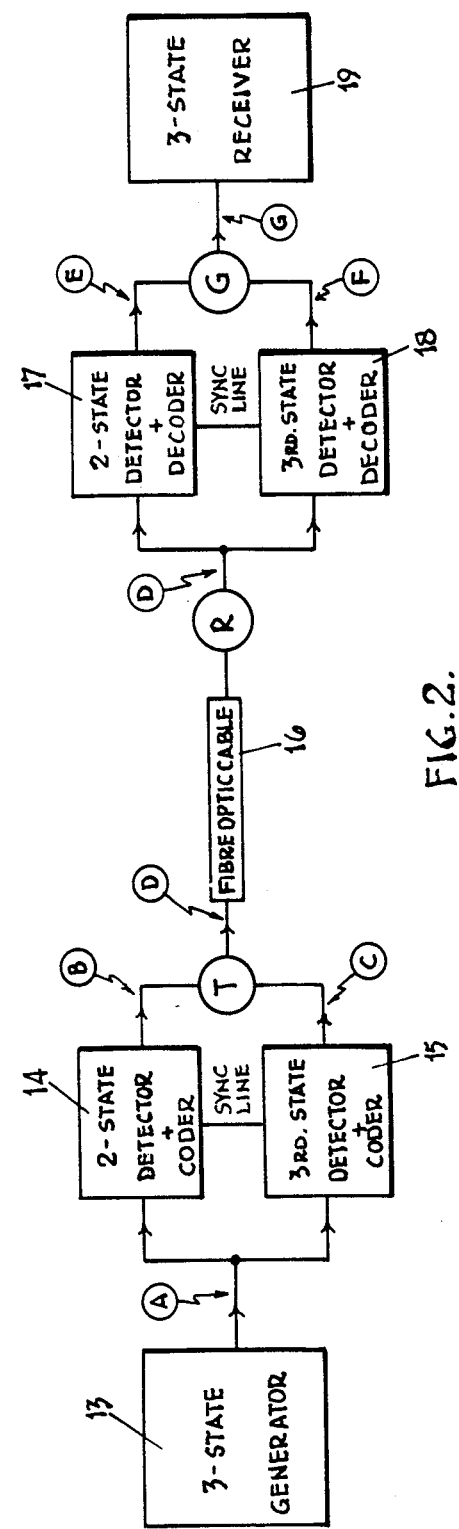

DATA TRANSMISSION SYSTEMS

The invention relates to data transmission systems.

For data transmission purposes it is common practice to use three-state signals comprising pulses of both polarities with respect to a datum level. Some transmission lines, however, such as a fibre optic cable, are adapted to transmit only two-state signals.

It is an object of the present invention to provide a data transmission system whereby this difficulty is overcome.

According to the present invention there is provided a data transmission system including a transmitting station comprising: means for generating a three-state first data signal comprising pulses of a fixed first duration and both polarities with respect to a datum level interspersed with portions at said datum level; means for converting said three-state data signal into a two-state second data signal comprising pulses of a fixed second duration less than said first duration, each pulse of one polarity in the first data signal being represented by a pulse in the second data signal, each pulse of the other polarity in the first data signal being represented by the absence of a pulse in the second data signal, and each said datum level portion in the first data signal being represented by a plurality of pulses in the second data signal occurring within a period of duration less than said first duration; and means for transmitting said two-state data signal along a transmission line.

The invention also provides a transmitting station and a receiving station of particular form for use in a system according to the invention.

FIG. 1 is a block diagrammatic representation of a conventional three-state data transmission system;

FIG. 2 is a block diagrammatic representation of a three-state data transmission system in accordance with the invention.

Figure 3:
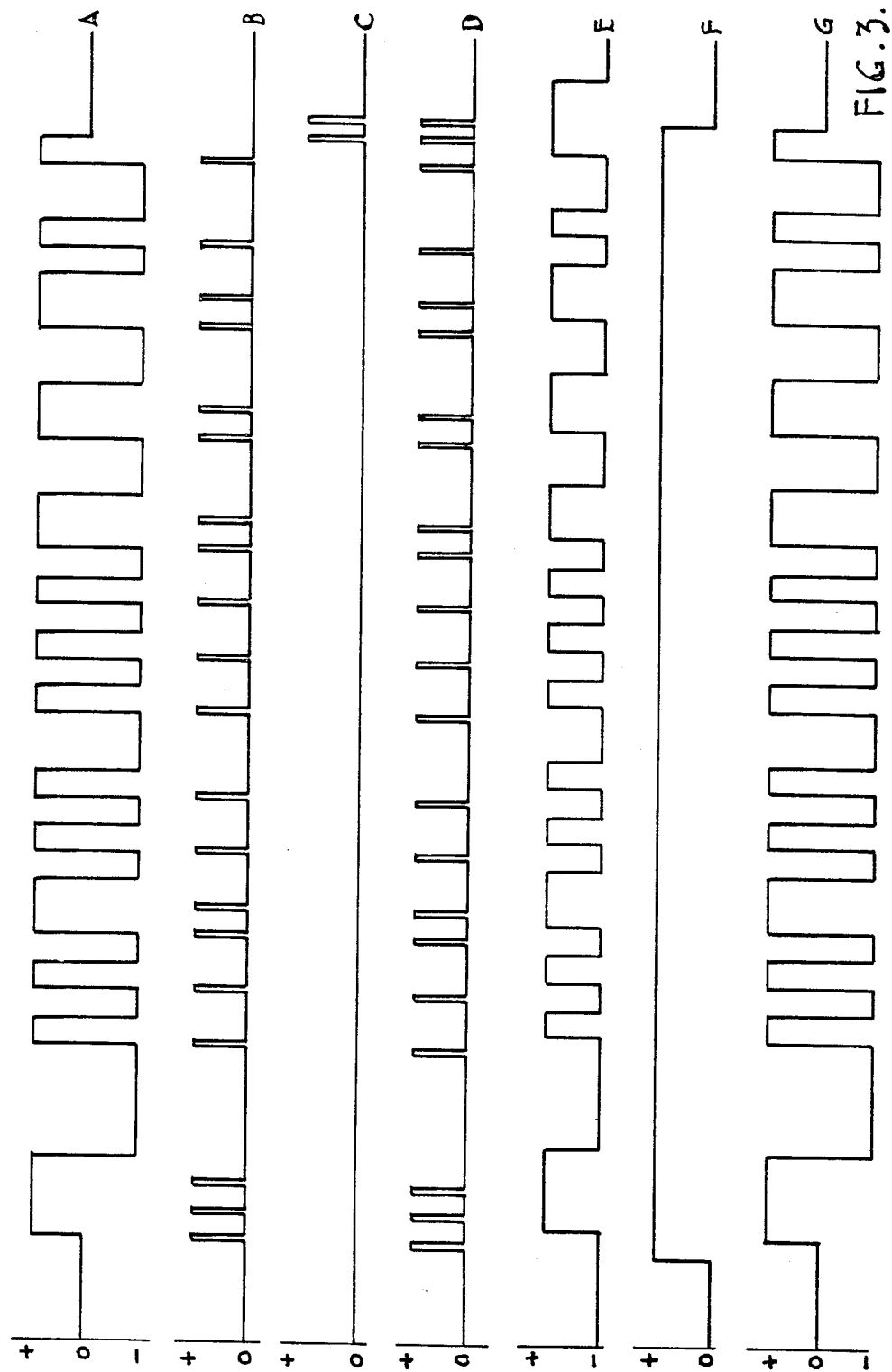
FIG. 3 illustrates the waveforms of signals occurring at various points in the systems of FIGS. 1 and 2.

FIG. 1 shows a typical conventional three-state data transmission system comprising a three-state data signal generator 10 coupled by a transformer Tx1 to a transmission highway comprising a pair of electrical conductors, typically a screened twisted pair of wires. A plurality of three-state data signal receivers 12 (one only shown) are each coupled by a separate transformer Tx2 to the transmission highway 11. The transformer coupling by transformers Tx1 and Tx2 is provided to ensure electrical isolation. Systems as shown in FIG. 1 are frequently utilized in aircraft for the transmission of data between different units.

A typical waveform of the data signal generated and transmitted in the system of FIG. 1 is shown by waveform A in FIG. 3. The data signal comprises a zero at the beginning and end thereof with positive and negative going fixed duration pulses completely filling the space therebetween. Thus, in the waveform A in FIG. 3, there are first three positive pulses, then four negative pulses, then a positive pulse, then a negative pulse, and so on. Such a method of coding data is known as Manchester II Biphase coding.

In the system of FIG. 1 the transmission line transmits three-state data signals and therefore transmission lines, such as optical fibres, which are adapted for the transmission of two-state data signals only cannot be used in such a system.

The present invention overcomes this problem by providing a system in which the three-state signals are converted to two-state signals for transmission, one such system being shown, by way of example, in FIG. 2.

Referring now to FIG. 2, the system shown therein includes a transmitter station comprising a three-state data signal generator 13 connected to a two-state data signal detector and coder unit 14 and to a third state data signal detector and coder unit 15 which are intercoupled by a sync line. The outputs of the two units 14 and 15 control an optical transmitter T whose output is applied to one end of fibre optic transmission line 16. Connected to the other end of the line 16 are a plurality of receiver stations (one only shown) each comprising an optical receiver R feeding a two-state data signal detector and decoder unit 17 and a third state data signal detector and decoder unit 18 intercoupled by a sync line. The outputs of the units 17 and 18 control a gate G whose output is applied in turn to a three-state data signal receiver 19.

The operation of the system of FIG. 2 will now be described with reference to the waveforms shown in FIG. 3. The output of generator 13, which is fed to units 14 and 15, is of the form illustrated by waveform A, as previously described. Such waveform A is utilised by unit 14 to produce a two-state data electrical signal of waveform B shown in FIG. 3. The waveform B comprises a plurality of pulses of equal duration, short compared with the pulse duration in waveform A, produced by sampling waveform A at its pulse rate, a pulse occurring in waveform B only when waveform A is positive when sampled. Thus, each positive going pulse in waveform A is represented by a corresponding shorter duration pulse in waveform B, and each negative pulse in waveform A is represented by the absence of a pulse in waveform B. When the waveform A goes to zero, the unit 15 produces two pulses within a period of shorter duration than the pulses in waveform A, as shown in waveform C. Waveforms B and C are combined and converted to light pulses in transmitter T, optical signals of waveform D thus being transmitted along line 16.

In the receiving station, the received optical signals are converted by the optical receiver R to electrical signals of corresponding waveform (waveform D). In response to the first pulse of waveform D, the output of unit 18 changes from a first value to a second value and enables gate G, the output of unit 18 being of waveform F. Unit 17 detects and decodes waveform D to produce a signal of waveform E corresponding to the modulated part of waveform A, the output signal of unit 17 passing via gate G to three-state receiver 19. When the pulses of waveform D corresponding to the pulses of waveform C are detected by unit 18, its output returns to its first value and closes gate G. To prevent unit 17 passing a pulse to receiver 19 in response to pulses of waveform C, the output of unit 17 is delayed by an amount equal to the time occupied by the pulses of waveform C, thus allowing unit 18 to close gate G in time to prevent such a pulse passing.

The gate G produces a zero output when it is closed, and otherwise produces a positive or negative output depending on the output of unit 17; a signal of waveform G which is a replica of waveform A is thus applied to receiver 19 from the output of gate G.

It will be appreciated that by virtue of enabling the transmission of three-state data via a fibre optic transmission line, the invention finds particular application for transmitting data through areas of high electromagnetic interference such as encountered, for example, in aircraft. Thus the invention enables fibre optics to be used in MIL Standard 1553 data transmission systems for aircraft.

We claim:

1. A data transmission system including a transmitting station comprising: means for generating a three-state first data signal comprising pulses of a fixed first duration and both polarities with respect to a datum level interspersed with portions at said datum level; means for converting said three-state data signal into a two-state second data signal comprising pulses of a fixed second duration less than said first duration, each pulse of one polarity in the first data signal being represented by a pulse in the second data signal, each pulse of the other polarity in the first data signal being represented by the absence of a pulse in the second data signal, and each said datum level portion in the first data signal being represented by a plurality of pulses in the second data signal occurring within a period of duration less than said first duration; and means for transmitting said two-state data signal along a transmission line.

2. A system according to claim 1 wherein said converting means comprises: a two-state detector and coder for generating in response to each pulse of said one polarity in the first data signal a pulse of said second duration; a third-state detector and coder for generating in response to the occurrence of a datum level portion in the first data signal a plurality of pulses occurring within a period of duration less than said first duration; and means for combining the outputs of said two-state and said third state detector and decoder.

3. A system according to claim 1 wherein said plurality is two.

4. A system according to claim 1 further including a receiving station connected to said transmitting station via said transmission line, the receiving station comprising: a two-state detector and decoder responsive to the received two-state data signal to produce a signal whose waveform is a replica of the three-state data signal between portions at said datum level delayed by the period within which said plurality of pulses occur; a third-state detector and decoder responsive to the received two-state data signal to produce an output which changes from a first value to a second value in response to the occurrence of any pulse in the received signal and returns to its first value only in response to the occurrence of a said plurality of pulses in the received signal; and gating means responsive to the outputs of said two-state and third state detector and decoder to pass the output of the two-state detector and decoder when the output of the third state detector and decoder has its second value, and to produce an output representative of said datum level when the output of the third state detector and decoder has its first value.

5. A system according to claim 1 wherein said transmission line is a fibre optic transmission line.

* * * * *